Oct. 15, 1968 G. B. PETERS 3,406,052
METHOD OF MAKING PLASTIC-COATED CORRUGATED FIBERBOARD
Filed Jan. 28, 1963
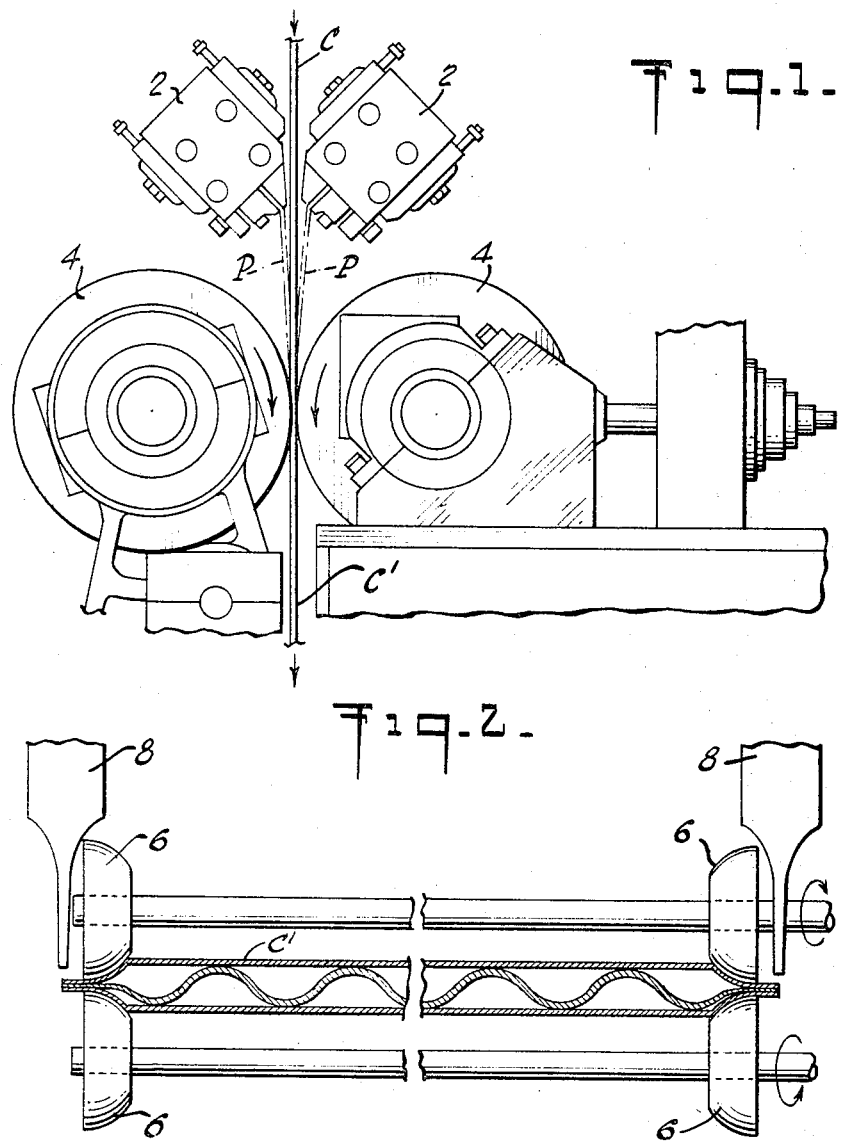
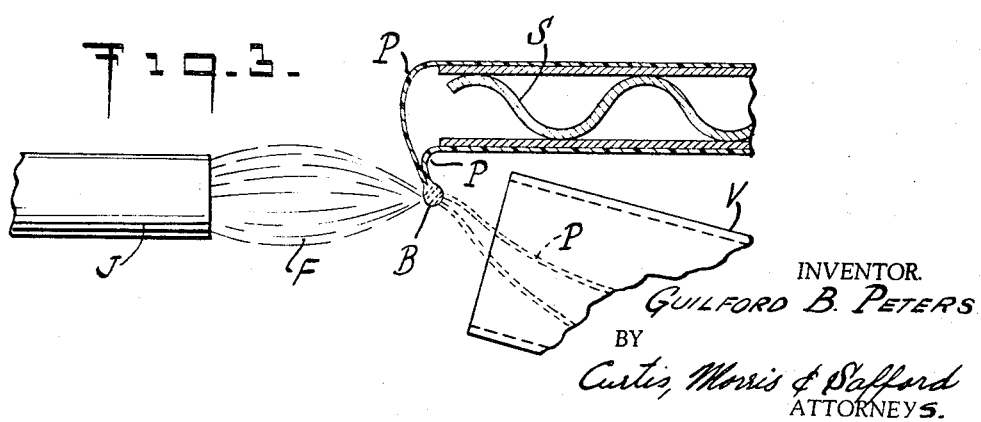
INVENTOR.
GUILFORD B. PETERS
BY
Curtis, Morris & Safford
ATTORNEYS.

United States Patent Office 3,406,052
Patented Oct. 15, 1968

3,406,052
METHOD OF MAKING PLASTIC-COATED
CORRUGATED FIBERBOARD
Guilford B. Peters, Mendham, N.J., assignor to Stapling
Machines Co., Rockaway, N.J., a corporation of
Delaware
Filed Jan. 28, 1963, Ser. No. 254,228
3 Claims. (Cl. 156—198)

This invention relates to a method of making corrugated fiberboard which is coated on one or both faces with a thin film of a thermoplastic material such as polyethylene.

Heretofore, in making coated corrugated fiberboard, it has been common practice first to coat kraft board and then form the corrugated material from the coated board. In commercial practice, this process has proved slow and expensive because the plastic coating substantially increases the time required for drying the glue by which the outer sheets of kraft board are attached to the corrugated inner sheet.

In the co-pending application of Guilford B. Peters and David K. Kingsley, Ser. No. 203,122, filed June 18, 1962, now abandoned, there is disclosed a machine having a closely spaced pair of horizontally extending slit extrusion dies for extruding thin films of thermoplastic material, such as polyethylene, and means for feeding the substrate sheets or webs of paper, fiberboard, wood veneer and the like, downwardly between the extrusion dies and then passing the substrate with the still heat-softened films at each face between a pair of hard-surfaced chill rolls which compress this sandwich together to cause the plastic films to adhere to the opposite faces of the substrate.

I have now discovered that corrugated fiberboard may be coated in a machine of this general type without crushing the flutes or appreciably reducing the structural strength of the corrugated board, by applying to the chill rolls a pressure sufficient to compress the corrugated board and the plastic film assembly to a thickness of approximately 80% to 97% of the original thickness of the corrugated board. This degree of compression does not strain the flutes substantially beyond their elastic limit, and therefore does not appreciably detract from the structural strength of the fiberboard. Nevertheless, it is sufficient to cause the plastic films to adhere strongly to the surfaces of the fiberboard. I have also found it advantageous to seal the edges of the coated sheet with a waterproof composition. The resulting product is a waterproof construction material which has many uses, for example in forming containers for fruit and vegetables subjected to hydrocooling and other types of refrigeration.

In the drawings:

FIGURE 1 is a cross-sectional view of a portion of a machine of the general type disclosed in the aforementioned copending application Ser. No. 203,122, illustrating a method of forming coated corrugated fiberboard in accordance with the present invention.

FIGURE 2 is a diagrammatic illustration of one method of sealing the edges of a coated fiberboard sheet in accordance with the present invention.

FIGURE 3 is a diagrammatic illustration of an alternative method of sealing the edges of a coated fiberboard sheet within the scope of the present invention.

FIGURE 1 illustrates a closely spaced pair of horizontally extending slit extrusion dies 2, for example of the type shown and described more fully in the aforementioned copending application Ser. No. 203,122. A thermoplastic material such as polyethylene is heated and supplied to the dies 2 under pressure, to cause thin films of molten plastic material P to be extruded therefrom.

A web or sheet of corrugated fiberboard material C is fed between the dies 2 on a generally vertically downward path, and the resulting sandwich of materials—the corrugated fiberboard material C with the still heat-softened plastic films P at its opposite faces—is fed downwardly between a pair of hard-surfaced chill rolls 4 constructed, mounted and driven, for example, as disclosed in the aforementioned copending application Ser. No. 203,122. The rolls 4 compress the materials to cause the plastic films P to adhere strongly to the faces of the corrugated fiberboard C and form a composite coated material C'.

It has been found that excellent adherence of the plastic films to the faces of the corrugated fiberboard substrate can be achieved without crushing the flutes of the substrate. As a specific illustrative example of operating conditions which I have found satisfactory, a polyethylene material, such as DuPont Alathon 16, is heated to a preferred temperature within the range of approximately 550° to 600° (with a permissible range of 485° to 650°) as measured at the dies 2 and the extruder is operated at a pressure of 1000 to 2000 p.s.i., as measured in the adapter, and 200 to 500 p.s.i., as measured in the dies, which may be achieved by using a die opening of .015" to .025" and rotating the feed screw at 40 to 80 r.p.m. in a 3½" diameter extruder barrel.

With an air gap between the dies 2 and the nip of the chill rolls 4 of between 5" and 10", and the chill rolls 4 rotated at such angular velocity as to feed the stock between them at a linear speed of 100 to 180 feet per minute (with a permissible range of 50 to 400 feet per minute), the films will be drawn down to a thickness of .001" to .002", without excessive "necking in" in width, and with the temperatures of the films at the proper value at the chill rolls to achieve good adhesion. The chill rolls are supplied with water at room temperature at such a rate of flow as to maintain the surfaces of the chill rolls within the range of 60° to 100° F., and preferably on the order of 84° F.

The movable left-hand chill roll 4 is urged toward the fixed right-hand chill roll 4, for example by pneumatic cylinders, as disclosed in the copending application Ser. No. 203,122, under a pressure sufficient to compress the stock sandwich to a thickness of approximately 80% to 97% of the uncompressed thickness of the corrugated fiberboard. For example, for type "A" fluted fiberboard, having an original thickness of .205", the sandwich may be resiliently compressed to a thickness of .175" to .185". For type "B" fluted fiberboard, having an original thickness of .125", the sandwich may be resiliently compressed to a thickness on the order of .100".

This may be accomplished by a line loading on the order of 200 to 300 pounds per linear inch (for example, a total force of the order of 6000 pounds on a sheet 24" in width).

Although the corrugated fiberboard may be fed through the chill rolls 4 with the flutes oriented either perpendicular to the direction of movement or parallel thereto, it has been found that a slightly more uniform appearance of the coated stock may be achieved if the fiberboard is fed through the rollers with the line of the flutes perpendicular to the direction of movement—that is, parallel to the axis of the rolls 4. When the stock is thus fed through the rolls the coated stock has less of a striated or striped appearance than when it is fed through with the flutes parallel to the path of the stock. Also, the corrugated fiberboard may be bent about a much shorter radius when it is fed with the flutes perpendicular to the path of the stock and thus, in continuous web form, can be more readily made to "turn the corner" and move out of the machine in a horizontal direction.

The corrugated fiberboard may also be coated when it is in the form of discrete sheets rather than in the form of a continuous web. However, if separate sheets are used, in order to achieve a uniform thickness of coating, it is desirable to feed the sheets between the dies 2 at close intervals so that the sandwich passing between the chill rolls 4 will draw the plastic films P down from the dies 2 more or less continuously and thus at a substantially uniform rate.

A fiberboard material coated in accordance with the process disclosed herein has been found to have materially greater structural strength than the same fiberboard material when uncoated. For example, uncoated type "A" fluted fiberboard has an average bursting strength on the order of 175 to 180 p.s.i., as measured in a Cady testing machine. When this material is coated in the manner disclosed, its bursting strength increases to the order of 200 to 210 p.s.i. A type "B" fluted material, which has an average bursting strength of 190 to 200 p.s.i. before coating, has been found to have a strength on the order of 200 to 205 p.s.i. after coating.

For reasons which are not fully understood, even the resistance of the material to compressive forces applied perpendicular to the plane of the sheet has been found to increase appreciably after coating. For example, type "A" fluted material, which has an average compression strength, as measured in a Riehle compression machine, of approximately 15 p.s.i. before coating, has been found to have a compression strength on the order of 18 p.s.i. after coating. Type "B" fluted material, which has an average compression strength of approximately 35 p.s.i. before coating, has been found to have a compression strength on the order of 47 p.s.i. after coating.

Moreover, the coated material is obviously much more resistant to moisture than the uncoated fiberboard. Although uncoated fiberboard quickly loses virtually all of its structural strength when it becomes wet, it has been found that coated corrugated fiberboard with the edges sealed to exclude moisture retains virtually all of its structural strength under prolonged spray testing and even immersion.

FIGURE 2 illustrates a process of sealing the edges of the corrugated fiberboard. The coated fiberboard C', in either discrete sheet or continuous web form, is passed between pairs of beveled rollers 6 under sufficient pressure to crush the edges. The crushed edges are then passed beneath applicators 8 which apply thereto a sealing material, such as a 50–50 mixture of polyethylene (for example, Elovax) and wax, which has been heated to the melting point. This molten material adheres to the edge of the coated fiberboard and is drawn to some extent between the lips of the crushed material by capillarity. It solidifies in a few seconds at room temperature, to seal the edges against moisture penetration.

FIGURE 3 illustrates an alternative method of sealing the edges of a coated sheet of corrugated fiberboard. As may be seen in this figure, the fiberboard sheet S is somewhat narrower than the plastic films P so that plastic films P overhang the edges of the sheet at either side. The sheet is fed past a vacuum orifice V, such as the intake to a vacuum cleaner of the conventional household type, which serves to pull the overhanging portions of the plastic films P down against one another, and a gas jet J is used to direct a flame F against the edges of the sheet to heat them to the melting point and cause them to flow together to form a bead B which seals the edge of the sheet S. As indicated in broken lines, the excess marginal portions of the plastic films P may be sucked into the vacuum orifice for disposal.

From the foregoing, it will be seen that the present invention provides a method of making coated corrugated fiberboard material which is practical and economical. However, it should be emphasized that the particular embodiment of the invention which is described herein and illustrated in the accompanying drawing, is intended as merely illustrative of the principles of the invention rather than as restrictive of the scope thereof, which is limited only by the appended claims.

I claim:
1. The method of making waterproof corrugated fiberboard which comprises, heating thermoplastic material and extruding it into two thin films extending generally vertically downwardly and slightly spaced apart horizontally, feeding corrugated fiberboard generally vertically downwardly between said films, passing said corrugated fiberboard with said films, still in heat-softened condition, at its opposite faces, between a pair of hard-surfaced rollers under a pressure sufficient to compress the composite material to a thickness of 80% to 97% of the original thickness of said corrugated fiberboard, to cause said films to adhere to said faces, crushing together vertically the edges of the coated sheet, and sealing the crushed edges by applying thereto in liquefied form a waterproof composition which solidifies thereon.

2. The method of making waterproof corrugated fiberboard which comprises heating thermoplastic material and extruding it into two thin films extending generally vertically downwardly and slightly spaced apart horizontally, feeding vertically downwardly between said films corrugated fiberboard sheet material having a width less than the width of said films, passing said corrugated fiberboard with said films, still in heat-softened condition, at its opposite faces, between a pair of hard-surfaced rollers under a presssure sufficient to compress the composite material to a thickness of 80% to 97% of the original thickness of said corrugated fiberboard, to cause said films to adhere to said faces, with said films overhanging the edges of the fiberboard sheet at each side, causing the overhanging portions of the two films at each edge of the coated sheet to move together, and heating said overhanging portions to cause them to fuse together and seal the edges of the sheet.

3. The method of making waterproof corrugated fiberboard which comprises heating thermoplastic material and extruding it into two thin films extending generally vertically downwardly and slightly spaced apart horizontally, feeding vertically downwardly between said films corrugated fiberboard sheet material having a width less than the width of said films, passing said corrugated fiberboard with said films, still in heat-softened condition, at its opposition faces, between a pair of hard-surfaced rollers under a pressure sufficient to compress the composite material to a thickness of 80% to 97% of the original thickness of said corrugated fiberboard, to cause said films to adhere to said faces, with said films overhanging the edges of the fiberboard sheet at each side, causing the overhanging portions of the two films at each edge of the coated sheet to move together, heating said overhanging portions to fuse them into a bead adjacent the edge of the fiberboard and seal the edges of the sheet, and removing the marginal portions of said films beyond said bead.

References Cited
UNITED STATES PATENTS

| | | | |
|---|---|---|---|
| 1,199,508 | 9/1916 | Swift | 161—137 X |
| 1,863,706 | 6/1932 | Wood | 161—137 |
| 2,901,770 | 9/1959 | Beck | 156—244 |
| 3,165,432 | 1/1965 | Plaskett | 156—244 |
| 3,172,571 | 3/1965 | Marchak | 222—107 |
| 1,583,381 | 5/1926 | Zimmerman | 161—44 |
| 2,011,468 | 8/1935 | Bronson | 161—44 |
| 2,690,206 | 9/1954 | Mueller | 156—244 |
| 3,019,483 | 2/1962 | Schultheiss | 264—171 |
| 3,230,127 | 1/1966 | Cleereman et al. | 156—244 |
| 3,234,064 | 2/1966 | Smith | 156—267 |

EARL M. BERGERT, *Primary Examiner.*

T. R. SAVOIE, *Assistant Examiner.*